United States Patent Office 3,773,909
Patented Nov. 20, 1973

3,773,909
CHALCOGENIDE SPINEL POWDERS
Donald Pearlman, Edward Carnall, Jr., and Thomas W. Martin, Rochester, N.Y., assignors to Eastman Kodak Company, Rochester, N.Y.
No Drawing. Filed Sept. 20, 1971, Ser. No. 182,128
Int. Cl. C01b 17/20, 19/00
U.S. Cl. 423—508                          21 Claims

ABSTRACT OF THE DISCLOSURE

This invention relates to a process for preparing chalcogenide spinel powder wherein the chalcogen is selected from the group sulfur, selenium, tellurium or mixtures thereof. The process involves contacting certain finely divided inorganic mixtures with a chalcogen source at a relatively low temperature. In a preferred embodiment a cyclical process is described.

---

This invention relates to chalcogenide powders having a spinel structure and methods of preparing same.

Reference is made to Carnall et al., Docket 35,088.0, U.S. patent application Ser. No. 181,992, entitled "Polycrystalline Chalcogenide Spinels," filed Sept. 20, 1971.

In the past a number of uses have been demonstrated for chalcogenide powders having a spinel structure. This is especially true of chalcogenide powders having a spinel structure wherein the chalcogenide is a divalent anion of sulfur, selenium, tellurium, or mixture thereof. Such chalcogenide spinel materials are known to have a variety of uses. For example, these materials may be useful as colorant materials, magnetic particles and as semiconductor materials. In addition to such applications, it has been proposed to use certain of these materials in certain optical and magneto-optical applications. However, to date, the use of these materials in optical devices has been impeded by the fact that the art has been unable to successfully prepare optically transparent chalcogenide spinels having a sufficient size to be of commercial potential. For example, to date, only relatively small single crystals of these chalcogenide spinels no greater than about 2–3 millimeters on a side have been prepared, and these have been of questionable purity and have possessed insufficient optical transparency to be useful in commercial optical applications.

A major problem associated with the development of an optically transparent chalcogenide spinel crystal element has been the inability to prepare finely-divided chalcogenide powders having a spinel structure from which larger polycrystalline chalcogenide spinel elements may be prepared. Such powders, of course, as suggested hereinabove, are not only useful as precursors in the preparation of polycrystalline optically transparent chalcogenide spinel elements, but in addition may be used directly as ferromagnetic materials, semiconductor materials, pigment materials, etc. Basically, the art has devised several methods for the preparation of finely-divided chalcogenide spinel powders of the type defined hereinabove. For more detailed information concerning these prior art procedures reference may be made to (1) "Growth Method and Properties of Magnetic Semiconducting Crystals of the Chalcogenide Spinels" by F. Okamoto et al. employed at the RCA Basic Research Center in Japan and published in Oyo Butsuri 39, 471–79 (1970) (An English translation by Ralph McElroy Company, Custom Division, 504 West 24th Street, Austin, Tex. 78705 is available); (2) G. Lapluye and L. Abello in Bulletin Societe Chimique de France, 1963, page 1062; and (3) British Pat. 1,146,481. The latter publication, British Pat. 1,146,481 describes the preparation of various mixed sulfide salts of a non-spinel character and various chalcogenide spinel materials of the formula $AB_2X_4$ described hereinabove from starting materials comprising various chromate and dichromate mineral salts of metallic ions. A major problem associated with the method of preparing chalcogenide spinel materials according to the process of British Pat. 1,146,481 utilizing chromate and dichromate mineral salts of metallic ions is that the British process apparently requires the use of various organo-chromate complexes which must themselves be specially prepared. Moreover, certain of these complexes such as the pyridine-chromate complex may decompose violently as by an explosion at temperatures of about 300° C.

In accordance with the present invention there is provided an efficient method for the preparation of chalcogenide spinel powders wherein the chalcogenide is selected from the group consisting of sulfur, selenium, tellurium, and mixtures thereof. Typical of the chalcogenide spinels prepared by the process of the invention are spinels having the formula $$AB_2X_4$$

wherein A and B represent suitable spinel components and X is a divalent chalcogenide anion selected from the group sulfur, selenium, tellurium and mixtures thereof. It will be appreciated that since the spinels, especially the chalcogenide spinels, are being extensively investigated at the present time, the particular elements, including mixtures of elements, which may be used as the A and B components of the spinel are being expanded to include new elements and mixtures thereof. Accordingly, no list of particular A and B components can be considered exhaustive. However, in view of the precise crystallographic structure exhibited by the chalcogenide spinels having the above formula irrespective of the particular A and B components thereof, it will be appreciated that the process of the present invention should not be restricted solely to the specific exemplary A and B components set forth hereinafter.

As an aid to the selection of the particular A and B components useful in the spinels of the above-noted formula and which may be prepared by the process of the invention, the article entitled "Spinel" appearing in vol. XII of the McGraw-Hill Encyclopedia of Science and Technology, published by McGraw Hill of New York (1971) at page 755 is hereby incorporated into the present application by reference thereto. In addition, the paper entitled "Band Structure and Electrical Properties of Ternary Chromium Chalcogenides" authored by W. Albers, G. Van Aller, and C. Haas in "Properties Thermodynamiques Physiques et Structurales des Derives Semi-Metalliques" a publication of the Centre National de la Recherche Scientifique, Paris, France (1967), may also be consulted as an aid in selecting suitable A and B components. This paper is also incorporated herein by reference thereto. An additional paper which may be consulted and which is incorporated herein by reference thereto is the paper entitled "Crystal Chemistry and Some Magnetic Properties of Mixed Metal Oxides with Spinel Structure" published in the Phillips Research Report, Supplement No. 3 (1964) by G. Blasse.

Generally, A in the above-noted formula may be defined as a cation of a metallic element or mixture of metallic elements having a net divalent charge. Thus A may be a divalent cation or a suitable mixture of univalent and trivalent cations having a net divalent charge. Typically A is selected from Periods 2–6 of Groups I–A, II–A, III–A, IV–A, and I–B—VIII–B of the Periodic Table. Representative elements from which A may be selected include lithium, lead, calcium, nickel, manganese, magnesium, aluminum, copper, indium, zinc, iron, mercury, cobalt and mixtures thereof. B of the above-noted formula is a trivalent cation and is typically selected from the group vanadium, titanium, molybdenum, tin, gallium, indium, germanium, chromium, cobalt, aluminum, iron and manganese. Typically, in the so-called normal spinels, the divalent A cationic components occupy the tetrahedral positions in the spinel crystalline lattice structure; the trivalent B cationic components occupy the octahedral positions in the crystal lattice; and the X components are in cubic closet-packed arrangement. In so-called inverse spinels, the trivalent B cations occupy the tetrahedral positions, and equally apportioned divalent A cations and trivalent B cations occupy the octahedral positions.

According to the present invention there is provided a process for making spinels having the above-noted formula which comprises contacting under heat a chalcogen source with an inorganic mixture to react said mixture with said source, the inorganic mixture comprising a mixture of a finely-divided substance having the formula AY and a finely-divided substance having the formula BY where A and B are as defined hereinabove and Y is an anionic function capable of essentially complete volatilization or of decomposing to yield a chalcogenide residue and an essentially volatile by-product.

As noted above, the $AB_2X_4$ product prepared by the process of the present invention may have multiple constituents forming the A and B cations thereof. For example, by the process of the invention there may be prepared such chalcogenide spinel powders as

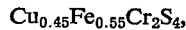
$Cu_{0.45}Fe_{0.55}Cr_2S_4$, $Cu_{0.5}Al_{0.5}Cr_2Se_4 Cu_{0.5}In_{0.5}Cr_2Se_4$, etc. In such cases it will be understood that AY and BY components used in the process of the invention actually contain a mixture of materials, each material individually having a formula corresponding to AY or BY. Thus, a material such as $Cu_mFe_{(1-m)}Cr_2X_4$ where $m$ is greater than or equal to 0 and less than or equal to 1.0 may be prepared by the process of the invention. For instance, as illustrated in Example 11 hereinafter, $Cu_{0.45}Fe_{0.55}Cr_2S_4$ may be prepared using as the AY component a mixture of copper oxide ($Cu_2O$) and iron oxide ($Fe_2O_3$) and using as the BY component chromium chloride ($CrCl_3$). Similarly, one could prepare a chalcogenide spinel powder having the formula, for example, $CdAl_nCr_{(2-n)}X_4$ wherein $n$ is a number greater than or equal to 0 and less than or equal to 2.0 by using as the AY component $CdCl_2$ and as the BY component a mixture of $CrCl_3$ and $AlCl_3$.

Essential to the process of the present invention is the use of a relatively low reaction temperature, especially a low initial reaction temperature. In addition, to insure that each of the AY and BY reactants is uniformly and adequately contacted with the chalcogen source, it is highly advantageous to main these reactants in a homogeneous, finely-divided admixture throughout the reaction. It will be appreciated, however, that the uniform treatment of and maintenance of the AY and BY reactants in a finely-divided mixture, may be carried out by a variety of means. In a preferred embodiment of the invention this may be accomplished by a cyclical operation wherein, in a typical cycle, a finely-divided mixture of reactants is heated in the presence of a chalcogen source, cooled to about room temperature (and, optionally, removed from the presence of the chalcogen source), subjected to mixing and then reheated in the presence of the chalcogen source in a suitable atmosphere to the desired reaction temperature to begin a new cycle. This cyclical operation is maintained until the desired conversion of AY and BY reactants to the chalcogenide spinel powder product is obtained. Generally, when using this cyclical operation to maintain the reaction mixture of AY and BY in homogeneous finely divided form, 2 to 6 or more cycles of heating, cooling and mixing may be employed. When using such a cyclical operation, the cooling step is advantageously carried out in an atmosphere which under the conditions of the cooling is incapable of reacting with the AY, BY, and chalcogen source materials. This is done to prevent contamination of the AY and BY reactants with other materials. It will be appreciated, of course, that the optimum number of cycles utilized will depend on a number of factors such as the reaction temperature, the desired degree of conversion from the AY and BY reactants to the chalcogenide spinel powder product and the specific materials chosen as the AY and BY reactants as well as the specific chalcogen source material selected.

The reaction temperature at which the process of the invention is carried out should be maintained at a relatively low level. This is done to minimize particle size and grain growth of the AY and BY components. Generally, the reaction temperature should be greater than about 200° C. but less than the decomposition temperature of the desired chalcogenide spinel powder. According to a preferred embodiment of the invention, the reaction temperature is maintained below the volatilization or sublimation temperature of the A and B cationic materials to prevent the formation of a second phase in the A and B materials. Naturally, the decomposition temperature of the chalcogenide spinel powder will vary depending on the particular chalcogenide spinel powder being prepared. However, it has been found that generally useful reaction temperatures for preparing these chalcogenide spinel powders lie within the range of from about 300° C. to about 1050° C. with a reaction temperature selected within the range of 400° C. to 950° C. being preferred. Preferably, the initial reaction temperature is selected within the range of from about 200° C. to about 500° C.

Respecting the chalocogen source material utilized in the reaction process of the invention, this term is defined as a material capable of yielding a reactive chalcogen of oxygen, sulfur, selenium, tellurium or mixture thereof at the reaction temperatures utilized in the process of the invention. For example, if one desires to prepare a sulfide chalcogenide spinel powder according to the process of the present invention, $H_2S$ may be utilized as the chalcogen source. In addition, other materials capable of yielding reactive sulfur may be used such as substantially pure sulfur, $CS_2$, etc. Similarly, if a selenide or telluride chalcogenide spinel powder is to be prepared, various materials capable of yielding reactive selenium or tellurium, respectively, may be used as the chalcogen source. Generally, it has been found preferable to use hydrogen sulfide as the chalcogen source when preparing a sulfide spinel powder. When preparing the selenide or telluride spinel powders according to the present invention, it has been found preferable to use substantially pure selenium or tellurium compounds as the chalcogen source materials. Where it is desired to prepare a chalcogenide spinel according to the invention which contains a mixture of chalcogens as the chalcogenide component, e.g. $CdCr_2S_2Se_2$, the chalcogen source may contain a material or mixture of materials capable of yielding a mixture of different reactive chalcogenides. In one embodiment of the present invention, the chalcogen source is initially selected as an oxygen yielding material such as air. In such case, using a reaction temperature of no more than 600° C. an intermediate material having the formula $AB_2O_4$ is prepared (where A and B are as defined above and O, of course, is oxygen). Upon formation of a substantial amount of the $AB_2O_4$ intermediate, the oxygen chalcogen source material is removed and replaced with a chalcogen source of a sulfur-, selenium-, tellurium-yielding material or mixture thereof whereby a final product is obtained having the formula $AB_2X_4$ where A, B and X are as defined above.

Concerning the atmosphere in which the process of the present invention is carried out, it will be appreciated that various reaction environments may be used depending on the particular chalcogenide spinel powder desired. For example, when preparing a pure sulfide spinel powder according to the present invention, the atmosphere should be essentially free of any material capable of reacting with the AY and BY reactants other than the free sulfur. Thus, when preparing a pure sulfide spinel powder one would avoid use of any materials capable of reacting with the AY and BY components other than the sulfur chalcogen source; for example, one would avoid the use of any reactive oxygen-containing materials in the atmosphere of the reaction. On the other hand, if one is preparing a pure selenide spinel powder according to the process of the invention, one would avoid the use of any material capable of reacting with AY and BY components other than the selenium chalcogenide source; for example, one would avoid the use of sulfur-containing materials in this case. (It will be appreciated that a variation of the foregoing procedure exists where one employs that embodiment of the invention described above wherein an oxygen chalcogenide spinel is first prepared as an intermediate which is subsequently converted to the desired sulfur, selenium, or tellurium chalcogenide spinel product.) Other materials which may be used to form a portion of the reaction atmosphere of the process of the invention include materials such as hydrogen, chlorine or the inert gases for example, argon, helium, etc. Such material and combinations of various other materials inert to the A, B, and the chalcogen source under the conditions of the process of the invention may also be used in the reaction atmosphere. Of course, in the simplest case, one may react AY and BY solely in the presence of a chalcogen source, for example, hydrogen sulfide, without any other additional component.

The finely-divided inorganic materials utilized in the process of the present invention may be selected from hydrated or anhydrous forms of materials having the formulas AY and BY where A and B are as defined hereinabove. Y represents an anionic function capable of essentially complete volatilization or capable of decomposing to yield a chalcogenide residue and essentially volatile by-products, at the reaction temperature of the process of the present invention. Typical anionic functions from which W may be selected include oxides, hydoxides, halides, halo-oxides, sulfates, sulfites, selenites, selenates, tellurates, tellurites, nitrates, nitrites, etc. Materials such as phosphates, silicates, etc. which partially volatilize but leave behind a contaminating residue, such as a phosphorous or silicon-containing residue, should be avoided. Although either the hydrated or anhydrous forms of the AY and BY materials may be used as finely-divided starting materials, anhydrous forms thereof are preferred since they appear to yield a more pure chalcogenide spinel powder product.

In a preferred embodiment of the invention, the materials AY and BY are selected such that the Y anionic functions of these components are identical, preferably halogens. That is, if, for example, AY represents cadmium chloride (i.e. $CdCl_2$), chromium chloride (i.e. $CrCl_3$) would be chosen as the BY reactant. A reason for choosing components having identical halide anionic functions in the preferred embodiment of the invention is the fact that applicants have discovered that generally the resultant chalcogenide spinel product obtained is of a higher degree of purity when the AY and BY reactants have identical anionic functions. This is especially desirable where one intends to use the resultant chalcogenide spinel powder to form optically transparent elements of the chalcogenide spinel powder as described in the co-filed Carnall et al. patent application referenced hereinabove. Of course, however, where one intends to use the resultant chalcogenide spinel powder in other applications such as in certain semiconductor applications or as a pigment material where such a high degree of purity is not necessarily needed, it is immaterial whether the anionic functions of the AY and BY components is the same or different.

Another embodiment of applicants' invention relates to the use of the BY component used in the present invention wherein Y, the anionic function, represents an oxide or other oxygen-containing anionic function and where B represents hexavalent chromium. In such case it is often desirabe to first convert the chromium oxide or other oxygen-containing anionic function of chromium to chromium hydroxide (i.e. $Cr(OH)_3$) and utilize the chromium hydroxide thus prepared as the BY reaction component. This is because many conventional chromium oxides or oxygen-containing chromium compounds have been heat-treated and converted to a refractory form of the chromium oxide or oxygen-containing chromium compound. Such refractory materials are not generally useful in the process of the present invention because of the extremely high temperature required to cause such refractory materials to react with the AY component. On the other hand, chromium hydroxides have been found to react quite readily with the AY component. These chromium hydroxides may be conveniently obtained as a precipitate from an aqueous solution of the chromium oxide or oxide-containing compound of chromium using hydrazine or similar basic reducing agent such as hydroxyamine, phenylhydrazine, etc. as the precipitant. It should be noted, however, that not all chromium oxides or oxygen-containing compounds of chromium are of a refractory nature and thus it is not advantageous to subject every chromium oxide or oxygen-containing compound of chromium to this pretreatment precipitation operation. For example, virgin chromium oxide (i.e., $Cr_2O_3$) can be conveniently utilized in the process of the present invention as the BY reactant because virgin chromium oxide is not in a refractory form.

According to a further embodiment of the invention the above-discussed formation of $Cr(OH)_3$ using a precipitant may be modified to form an intimate finely-divided mixture of both the AY and BY components. According to this embodiment, an aqueous solution of hexavalent chromium oxide is formed as discussed above. To this solution is added an amount of a material having the Formula AZ (where A is as defined hereinabove and Z is an anionic function) which is soluble in the aqueous hexavalent chromium solution. Thus, there is formed an aqueous solution of hexavalent chromium cations, A cations, and Z anions, the acidic character of the hexavalent chromium aqueous solution being used to dissolve the AZ material. Typical AZ materials which are soluble in such an aqueous solution include $CdCl_2$, $CdO$, $ZnO$, $CoCl_2$, $CoCl_3$, $Fe_2O_3$, etc. The precipitant, such as hydrazine, is then added to the aqueous solution in an amount effective to precipitate an intimate, finely-divided mixture of $Cr(OH)_3$ and AOH which may be used as the BY and AY components, respectively, in the process of the invention. Conveniently, when using this embodiment of the invention, two moles of hexavalent chromium oxide are dissolved in aqueous solution for each mole of the AZ component dissolved in the aqueous solution. Using these preferred molar ratios, there is obtained an intimate, finely-divided mixture of the $Cr(OH)_3$ and AOH in a ratio corresponding to the stoichiometric proportion of A and B in the resultant chalcogenide spinel, namely $Cr_2X_4$. This embodiment of the invention is especially preferred wherein the resultant chalcogenide spinel powder is to be used to form a polycrystalline chalcogenide spinel element as described in the copending Carnall et al. application referenced herein.

In Table I presented hereinbelow there is shown a number of typical chemical reaction equations illustrating the overall chemical reaction occurring in the present invention.

TABLE I (a) $CdCl_2 + CrCl_3 \xrightarrow{H_2S} CdCr_2S_4$ (b) $Cd(OH)_2 + 2Cr(OH)_3 \xrightarrow{H_2S} CdCr_2S_4$ (c) $CdO + 2CrO_3 + H_2S \longrightarrow CdCr_2S_4$ (d) $CdO + Cr_2O_3 + H_2S \longrightarrow CdCr_2S_4$ (e) $CdCl_2 \cdot 2\tfrac{1}{2}H_2O + Cr_2(SO_4)_3 \cdot 5H_2O \xrightarrow{H_2S} CdCr_2S_4$ (f) $CdO + 2CrO_3 + CS_2 \longrightarrow CdCr_2S_4$ (g) $CdO + 2CrO_3 \xrightarrow[H_2S]{Cl_2} CdCr_2S_4$ (h) $CdO + CrO_3 + CS_2 \xrightarrow{Cl_2} CdCr_2S_4$ (i) $CdCl_2 + CrCl_3 \text{ (CCl}_4\text{ dried)} + H_2 + Se \longrightarrow CdCr_2Se_4$ (j) $CdCl_2 + CrCl_3 \text{ (SOCl}_2\text{ dried)} + H_2 + Se \longrightarrow CdCr_2Se_4$ (k) $Cd(OH)_2 + 2Cr(OH)_3 \xrightarrow{H_2 + Se} CdCr_2Se_4$ In addition to the foregoing reaction sequences which have been used according to the present invention to prepare the chalcogenide spinel products indicated, similar reaction sequences may be used to prepare the following additional chalcogenide spinel powders:

(1) $Cu_{0.45}Fe_{.55}Cr_2S_4$
(2) $HgCr_2Se_4$
(3) $CoCr_2S_4$
(4) $HgCr_2S_4$
(5) $ZnCr_2S_4$
(6) $Cu_{.5}Al_{0.5}Cr_2Se_4$
(7) $Cu_{.5}In_{.5}Cr_2Se_4$

Typical overall chemical reactions occurring in the process of the present invention are outlined in Table I above. Although the specific reaction mechanism occurring in the process of the invention is not fully understood, it is believed that actually a series of three reaction mechanisms are involved in the formation of a chalcogenide spinel powder obtained in the process of the present invention. Thus, for example, considering the reaction mechanism involved where AY represents cadmium chloride and BY represents chromium chloride and where the chalcogen source is hydrogen sulfide, it is believed that the following reactions are occurring:

(a) $CdCl_2 + H_2S \rightarrow CdS + 2HCl$
(b) $2CrCl_3 + 3H_2S \rightarrow Cr_2S_3 + 6HCl$
(c) $CdS + Cr_2S_3 \rightarrow CdCr_2S_4$ Under the conditions of the process it is believed that mechanisms (a) and (b) above proceed to completion. The rate of reactions (a) and (b) depend primarily upon temperature, but the particle size (or surface area) is also believed to have an effect. The smaller particle with its larger surface is believed to react faster. Reaction (c) shown above is actually believed to represent an equilibrium relationship as carried out in an inert atmosphere such as is present in the process of the present invention. The reverse reaction, that is the dissociation of the chalcogenide spinel product obtained in reaction (c) is believed to take place at high temperatures. This, therefore, is the reason for avoiding the use of high reaction temperatures above the decomposition temperature of the chalcogenide spinel product desired.

As indicated above, the chalcogenide powders of the present invention have a spinel structure. The crystalline form of these spinel materials may be further characterized as cubic crystals. For this reason, these chalcogen spinel powders are optically isotropic, that is, they do not have directionally dependent optical properties. Thus, the index of refraction within adjacent grains is the same regardless of the relative crystallographic orientation. Accordingly, if impurities are substantially eliminated from these chalcogenide spinel powders and voids are eliminated from between adjacent grain boundaries, reflections between the multiple surfaces of adjacent grains will be eliminated and scattering will be reduced. In other words, polycrystalline element consisting of a compacted mass of this powder without impurities and voids between adjacent grains may be substantially transparent. Greater detail concerning polycrystalline elements prepared from these powders is set forth in the copending Carnall et al. application referred to hereinabove. Generally, if the process of the invention is carried out under the optimum conditions set forth hereinabove, it is possible to obtain chalcogenide spinel powders having a cubic crystallographic structure and which are substantially free of impurities. For example, where sulfur or selenium-containing materials are the chalcogen source used in the invention and where B represents chromium, under optimum conditions one can generally expect to obtain chalcogenide spinel powders which are more than 96% pure chalcogenide spinel product. As noted above, however, chalcogenide spinel powders having a lesser degree of purity may also be prepared and also represent useful products where it is not desired to obtain optically transparent elements from these powders, for example, where the resultant chalcogenide spinel powder is intended for use as a pigment, etc. and transparency is not a necessary property. The particle size of the chalcogenide spinel powders of the invention may also vary. In large measure, the resultant particle size will depend upon the particle size of the reactants AY and BY maintained during the reaction process. Thus, if, for example, extremely small particles of AY and BY components are used as starting materials and the size of these particles is carefully maintained throughout the process, one will obtain resultant chalcogenide spinel powders having a similar small particle size. If, on the other hand, larger particle sizes of AY and BY reactants are utilized to begin with and/or if the initial small particle size of the AY and BY reactants is not so carefully maintained throughout the reaction, one will obtain resultant chalcogenide spinel powders having a substantially larger particle size. Generally, the particle size of the resultant chalcogenide spinel powders obtained by the process of the present invention have a B.E.T. surface area on the order of about 40 to about 0.2 m.$^2$/g.; preferably on the order of about 0.6–3 m.$^2$/g.

The relative amounts of AY and BY and chalcogen source reactant used in the process of the invention may vary over a considerable range. Where an essentially pure chalcogenide spinel powder product is desired, it is believed preferable to utilize the initial AY and BY reactants in a ratio corresponding to the stoichiometric proportion of A and B components in the resultant chalcogenide spinel powder product. However, where the degree of purity of the resultant product is not so important, the ratio of AY and BY reactants may vary over a fairly wide range.

As suggested above, the particle size and purity of the finely-divided AY and BY reactants used in the process of the invention as well as the particle size of the chalcogen source may be at least in part accountable for the relatively fast rate and low process time of the present invention. For this reason, it is desirable to employ AY and BY reactants of a small size on the order of from about .001 to about 100 microns, preferably from about .01 to about 1.0 micron. For similar reasons it is often desirable to use a gas such as H$_2$S as the chalcogen source materials.

The practice of the invention may be illustrated by means of the following examples:

EXAMPLE 1

In the preferred embodiment of our invention, stoichiometric mixtures of chromium chloride hydrate and cadmium chloride hydrate were dehydrated. The anhydrous mixture was transferred to a furnace where it was converted to the spinel.

A mixture of 50 g. (0.1875 mole) of $CrCl_3 \cdot 6H_2O$ and 21.4 g. (0.0938 mole) of $CdCl_2 \cdot 2\frac{1}{2}H_2O$ was ground together and dried with thionyl chloride following the procedure given by A. Pray, Inorganic Synthesis, vol. V, p. 153, McGraw-Hill Book Co. (1957). The dried material was transferred from the reaction flask directly to a quartz firing boat which was placed in an Ar purged tube, maintained at 500° C. $H_2S$ was passed over the material at a flow rate of about 700 cc./minute and the sample was heated in the $H_2S$ using the following regime: The material was heated at 500° C. for 2½ hours, cooled to room temperature under $H_2S$. After mixing in a mortar for about 5–15 minutes, a small sample was removed for X-ray diffraction analysis. It was identified as 1 part $CdCr_2S_4$, 1 part $Cr_2S_3$ and 3 parts CdS. The mixture was placed into an Ar purged furnace tube maintained at 800° C. and heated for 2½ hours in a current of $H_2S$ (ca. 400 cc./minute). The powder was again cooled to room temperature, remixed and a sample analyzed by X-ray diffraction. It was found to consist of $CdCr_2S_4$ and a trace of $Cr_2S_3$. The remainder was refired at 950° C. for 1 hour in a stream of $H_2S$ (ca. 400 cc./minute).

Twenty-six grams of $CdCr_2S_4$ product was obtained which was magnetic at liquid nitrogen temperature, showed only the presence of a spinel phase by X-ray diffraction and contains less than 0.03% oxygen as determined by neutron activation analysis.

The powder had a surface area of 0.660 m.²/g. and an apparent density of 1.64 g./cc.

EXAMPLE 2

An intimate mixture of 31.7 g. $CrCl_3$ (0.2 mole), 18.34 g. $CdCl_2$ (0.1 mole) and 65 g. Se (0.82 mole), contained in a quartz boat, was inserted into an Ar purged furnace tube maintained at 250° C. Hydrogen was passed through the tube at a rate of 500 cc./minute. The furnace temperature was raised to 400 over a period of 2 hours, then held at 400° C. for 1½ hours. Following this treatment, the temperature was raised to 600° C. and kept at this temperature for 2 hours. The reaction product was cooled in Ar to room temperature. After mixing the material, there was added 7.5 g. Se, and the mixture was refired in $H_2$ at 600° C. for 2½ hours. After cooling in Ar, remixing and dosing with an additional 3.5 g. of Se, the mixture was fired at 700° C. for 1 hour in the hydrogen (500 cc./mm.). On cooling to room temperature, 46 g. of $CdCr_2Se_4$ product was recovered. The product contained 59.8% Se, <0.1% $O_2$ and of the order of 1% of residual Cl by analyses. Only the spinel phase was detected by X-ray diffraction analyses.

The measured density of the pressing was 5.6504 g./cc. The powder had an apparent density of 1.46 g./cc. and a surface area of 0.910 m.²/g.

EXAMPLE 3

To a filtered solution of 40 g. $CrO_3$ (0.4 mole) and 25.68 g. CdO (0.2 mole) in 200 cc. of water, was added slowly and with stirring 400 cc. of a water containing 10 cc. hydrazine. The resulting precipitate was allowed to stand for 90 minutes, whereupon it was filtered and dried for 17 hours at 150° C.

Thirty grams of the finely ground dried precipitate was subjected to the following treatment with $H_2S$ (400 cc./mm.).

(a) Insert into furnace tube at 200° C., raise temperature to 350° C. over 3 hours. Cool in Ar.

(b) Mix, replace in 350° C. furnace; quickly raise temperature to 500° C., hold for 2½ hours. Cool in Ar.

(c) Mix, replace in 500° C. furnace, quickly raise temperature to 800° C., hold for 2½ hours. Cool in Ar.

(d) Mix, replace in 800° C. furnace, and quickly raise temperature to 900° C., hold for 1 hour. Cool in Ar.

X-ray diffraction revealed no second phase in the $CdCr_2S_4$ product obtained. The product had an oxygen content of 0.08%.

EXAMPLE 4

A quantity of the finely divided dried precipitate mixture described in Example 3 was fired in air at 600° C. for 4 hours. The product was identified by means of X-ray diffraction as $CdCr_2O_4$.

Thirty grams of the chromite was then treated in $H_2S$ (400 cc./minute) following the sequence of steps (a)–(b) described in Example 3.

The product of $CdCr_2S_4$ which was thus obtained contained a trace (<1%) of $Cr_2S_3$ as determined by X-ray diffraction. An analysis of the product showed the presence of 37.1% S and 0.15% $O_2$.

EXAMPLE 5

An intimate mixture of 16.0 g. $CrO_3$ (0.16 mole) and 10.27 g. CdO (0.8 mole) was treated in a mixture comprised of 700 cc./min. $H_2S$, 500 cc./min. $H_2$ and 50 cc./min. of HCl using the following cycle:

Fire at 300° C. for 1½ hours. Cool in $H_2+H_2S$. Mix.
Fire at 500° C. for 1 hour. Cool and remix.
Fire at 800° C. for 2½ hours. Cool and remix.
Fire at 950° C. for 1 hour. Cool.

The product of $CdCr_2S_4$ which was obtained weighed 25 g., contained 2.75% $O_2$ and 36.5% S. The crystallographic lattice spacing $A_o$ was 10.242.

EXAMPLE 6

The $CdCl_2$ used in this example was dried with $SOCl_2$, following the procedure of Pray, referred to in Example 1. The $CrCl_3$ was dried over $CCl_4$ following Heisig, Farkes and Heden, Inorganic Syntheses II, p. 193, McGraw-Hill Book Co. (1946).

An intimate mixture of 17.2 g. (0.0938 mole) $CdCl_2$ and 29.72 g. (.1875 mole) $CrCl_3$, contained in a quartz boat, was placed in an Ar purged furnace tube maintained at 500° C. and was fired in a $H_2S$ stream flowing at a rate of 700 cc./min. using the following sequence.

(a) Hold at 500° C. for 2½ hours. Cool under $H_2S$. X-ray diffraction of a probe detected a mixture of CdS crystals and tetragonal $Cr_2S_3$ crystals.

(b) Mix, replace in 500° C. furnace, reduce $H_2S$ flow to 400 cc./min., quickly heat to 800° C. and hold at 800° C. for 2½ hours. Cool to room temperature under $H_2S$.

The product, 30 gm., analyzed as 0.036% $O_2$ and consisted of $CdCr_2S_4$ containing no impurities detectable by X-ray diffraction.

EXAMPLE 7

An intimate mixture of 48.2 g. $Cr_2(SO_4)_3 \cdot 5H_2O$ (0.1 mole) and 22.83 g. $CdCl_2 \cdot 2\frac{1}{2}H_2O$ (0.1 mole) contained in a quartz boat was inserted into an Ar purged furnace tube maintained at 200° C. and was fired in an $H_2S$ stream flowing at 400 cc./min. using the following sequence.

(a) Raise temperature from 200–350° C. over period of 3 hours. Cool under Ar Mix.

(b) Replace into a 350° C. furnace, raise temperature to 500° C., hold for 2½ hours. Cool under Ar. Mix. A small sample of this material was removed. X-ray diffraction analysis showed it to consist of 4 parts $CdCr_2S_4$, 2 parts CdS; 2 parts of a mixture of $Cr_2S_3$ and $Cr_3S_4$.

(c) Replace remainder into 500° C. furnace and quickly heat to 800° C., hold at 800° C. for 2½ hours, cool under Ar Mix. A small sample of this material was removed. It was shown to consist of 9 parts of $CdCr_2S_4$, and approximately 1 part each of CdS and $Cr_2S_3$.

(d) Replace remainder into 800° C. furnace, quickly heat to 900° C., hold at 900° C. for 1 hour. Cost under Ar.

The product, 25 g., had an oxygen content of 0.1%. X-ray diffraction analysis showed the presence of $CdCr_2S_4$ contaminated with a small amount of CdS and $Cr_2S_3$.

EXAMPLE 8

Thirty-five g. of a mixture of cadmium and chromium hydroxides, precipitated as in Example 3, intimately mixed with 45 grams of finely divided Se and contained in a quartz boat was placed into an Ar purged tube maintained at 200° C. The material was subjected to the following heat treatment in hydrogen, flowing at a rate of 500 cc./min.:

(a) The temperature was raised to 350° C. over a period of 5 hours, then quickly to 500° C. where it was held for 1½ hours. The material was then cooled to room temperature under Ar and mixed. A sample was removed for analyses and it was shown to contain approximately equal parts of $CdCr_2Se_4$, CdSe and $Cr_2Se_3$.

(b) Ten grams of Se were added to the remainder and thoroughly mixed. The material was reintroduced into the furnace at 500° C., held at 500° C. for ½ hour, then quickly heated to 600° C. and held there for 1½ hours. After cooling in Ar and mixing, a probe was submitted to X-ray analyses which showed the presence of approximately 30% $CdCr_2Se_4$, 10% CdSe, and 1% $Cr_2S_3$.

(c) The ground product was mixed with 2.5 g. Se in the furnace and reheated at 600° C. for ½ hour. The temperature was then raised rapidly to 700° C. and held there for 1½ hours.

Thirty-five grams of product were recovered containing .1% $O_2$. By X-ray analysis, it was found to consist of approximately 80% $CdCr_2Se_4$, 10% CdSe and 10% $Cr_2Se_3$.

EXAMPLE 9

An intimate mixture of 12.8 g. CdO+20.0 g. $CrO_3$ was placed in a quartz boat and inserted into an Ar purged furnace tube maintained at 200° C. A vigorous stream of Ar (about 1000 cc./mm.) was bubbled thru a large wash tower containing $CS_2$. The material was subjected to the gas stream under the following firing sequence:

(a) The temperature was raised from 200° C. to 350° C. over a period of 3 hours. The product was cooled under the Ar—$CS_2$ gas mixture. After mixing, a small sample was submitted for X-ray analyses. No identification could be made because of the fineness of the powder.

(b) the remainder was inserted into the 350° C. furnace tube and the temperature quickly raised to 500° C. and kept there for 2 hours, then cooled. A sample of the remixed material analyzes as 1 part $CdCr_2S_4$, 16 parts CdS and 5 parts $Cr_2O_3$.

(c) The remainder was fired at 500° C. for an additional hour, the temperature quickly raised to 800° C. and held there for 3 hours. The product after cooling was remixed. A probe showed the material to consist of $CdCr_2S_4$ only.

EXAMPLE 10

Thirty grams of $CdCrO_4$, prepared as in Example 4, was ground together with 45 g. of Se, transferred to a quartz boat which was inserted into an Ar purged tube maintained at 200° C. The mixture was heated in a stream of hydrogen flowing at a rate of 500 cc./min. under the following sequence:

(a) The temperature was raised to 350° C. over a period of 3 hours, the material was cooled to room temperature under Ar and mixed. A sample was shown by X-ray diffraction analyses to contain approximately 50 parts of $CdCr_2O_4$ and 1 part of CdSe.

(b) The remainder of the material was reinserted into the furnace at 350° C., the temperature quickly raised to 500° C. and held at 500° C. for 1½ hours. After cooling to room temperature under Ar and mixing, a sample was analyzed by X-ray diffraction. It consists of 3 parts $CdSr_2Se_4$, 1 part CdSe and 1 part $Cr_2Se_3$.

(c) The remainder was mixed with 10 g. Se, reinserted into the 500° C. furnace, held at 500° C. for 1 hour, then the temperature was raised quickly to 600° C. and held at 600° C. for 1½ hours. The powder was then cooled to room temperature under Ar, mixed, and a sample was analyzed by X-ray diffraction. It was found to contain about 85 parts $CdCr_2Se_4$ and about 7 parts each of CdSe and $Cr_2Se_3$.

(d) The remainder was mixed with 5.0 g. Se, reinserted into the furnace at 600° C., the temperature quickly raised to 700° C. and kept there for 1½ hours. The material then was cooled to room temperature under Ar. The product which weighed 22 grams analyzed as $CdCr_2Se_4$ and 1–2% of a non-identifiable impurity.

EXAMPLE 11

An intimate mixture of 3.22 g. $Cu_2O$ (0.0225 mole) 4.89 g. $Fe_2O_3 \cdot H_2O$ (0.0275 mole) and 31.68 g. $CrCl_3$ (0.2 mole) contained in a quartz boat was inserted into an Ar purged furnace at 200° C. and heated in $H_2S$ as follows:

(a) With $H_2S$ flowing at 700 cc./min., the temperature was raised to 600° C. over a period of 3 hours. The mixture was cooled to room temperature under Ar. The remixed mixture was replaced into the furnace at 600° C. and fired for 2 hours in $H_2S$ flowing at 400 cc./min. On cooling to room temperature under Ar, 29 grams of $Cu_{0.45}Fe_{0.55}Cr_2S_4$ product was obtained. X-ray diffraction analyses showed only the presence of a spinel phase. The material was highly magnetic at room temperature.

The invention has been described in detail with particular reference to certain preferred embodiments thereof, but there will be understood that variations and modifications can be effected within the spirit and scope of the invention.

We claim:

1. A process for preparing a powder comprising finely-divided particles of a substance having the formula:

$$AB_2X_4$$

wherein A is a divalent metallic cation, or a suitable mixture of univalent and trivalent metallic cations having a net divalent charge, of a substance selected from Periods 2–6 of Groups I-A—IV-A and I-B—VIII-B of the Periodic Table;

wherein B is a trivalent cation of a substance selected from the group consisting of vanadium, titanium, molybdenum, tin, gallium, indium, germanium, chromium, iron, manganese, and aluminum; and wherein X is an anion of a substance selected from the group consisting of sulfur, selenium, tellurium, and mixtures thereof;

said process comprising contacting an inorganic mixture with a chalcogen source at a temperature greater than about 200° C. and less than the decomposition temperature of the desired $AB_2X_4$ powder to react said mixture with said source, said chalcogen source comprising a reactive chalcogen component selected from the group consisting of sulfur, selenium, tellurium, and mixtures thereof, said mixture comprising a physical mixture of a finely-divided substance having the formula AY and a finely-divided substance having the formula BY, wherein A and B are as defined hereinabove and Y is an anionic function capable of volatilization at said contacting temperature without leaving a contaminating residue.

2. A process for preparing a powder comprising finely-divided particles of a substance having the formula:

$$AB_2X_4$$

wherein A is a dilvalent metalic cation, or a suitable mixture of univalent and trivalent metallic cations having a net divalent charge, of a substance selected from Periods 2–6 of Groups I–A—IV–A and I–B—VIII–B of the Periodic Table;

wherein B is a trivalent cation of a substance selected from the group consisting of chromium, iron, manganese, and aluminum; and wherein X is an anion of a substance selected from the group consisting of sulfur, selenium, tellurium, and mixtures thereof;

said process comprising (a) contacting an inorganic mixture with a chalcogen source at a temperature greater than about 200° C. and less than the decomposition temperature of the desired $AB_2X_4$ powder in an environment inert to said mixture and source at said temperature to react said mixture with said source, the chalcogen source comprising a reactive chalcogen component selected from the group consisting of sulfur, selenium, tellurium, and mixtures thereof, the inorganic mixture comprising a physical mixture of a finely-divided substance having the formula AY and a finely-divided substance having the formula BY, wherein A and B are as defined hereinabove and Y is an anionic function capable of volatilization at said contacting temperature without leaving a contaminating residue; (b) cooling said mixture; (c) mixing said mixture to maintain the mixture in finely-divided form; and (d) repeating the cycle defined by (a)–(c).

3. A process for preparing a powder comprising finely-divided particles of a substance having the formula:

$$ACr_2X_4$$ 

wherein A is a divalent metallic cation or a suitable mixture of univalent and trivalent metallic cations having a net divalent charge selected from the group consisting of aluminum cations, copper cations, indium cations, zinc cations, iron cations, mercury cations, cobalt cations, cadmium cations, and mixtures thereof; and wherein X is a material selected from the group consisting of sulfur, selenium, and mixtures thereof; said process comprising contacting an inorganic mixture with a chalcogen source at a temperature greater than about 200° C. and less than the decomposition temperature of the desired $ACr_2X_4$ powder in an environment inert to said mixture and source at said temperature to react said mixture with the chalcogen component of said source, the chalcogen source comprising a reactive chalcogen component selected from the group consisting of sulfur, selenium, and mixtures thereof, the inorganic mixture comprising a mixture of a finely-divided substance having the formula AY and a finely-divided substance having the formula CrY, wherein A is as defined hereinabove and Y is an anionic function capable of volatilization at said contacting temperature without leaving a contaminating residue.

4. The process according to claim 3 wherein said mixture is maintained in finely-divided form by mixing said mixture during said process.

5. A process for preparing a powder comprising finely-divided particles of a substance having the formula:

$$ACr_2X_4$$ 

wherein A is a divalent metallic cation or a suitable mixture of univalent and trivalent metallic cations having a net divalent charge selected from the group consisting of aluminum cations, copper cations, indium cations, zinc cations, iron cations, mercury cations, cobalt cations, cadmium cations, and mixtures thereof; and wherein X is a material selected from the group consisting of sulfur, selenium, and mixtures thereof; said process comprising (a) contacting an inorganic mixture with a chalcogen source at a temperature greater than about 200° C. and less than the decomposition temperature of the desired $ACr_2X_4$ powder in an environment inert to said mixture and source at said temperature to react said mixture with the chalcogen component of said source, the chalcogen source comprising a reactive chalcogen component selected from the group consisting of sulfur, selenium, and mixtures thereof, the inorganic mixtures comprising a mixture of a finely-divided substance having the formula AY and a finely-divided substance having the formula CrY, wherein A is as defined hereinabove and Y is an anionic function capable of volatilization at said contacting temperature without leaving a contaminating residue; (b) cooling said mixture in an atmosphere inert to said A, B and chalcogen source components under the conditions of said cooling; (c) mixing said mixture to maintain the mixture in finely-divided form, and (d) repeating the cycle defined by (a)–(c).

6. The process of claim 5 wherein the powder prepared is a material selected from the group consisting of $CdCr_2S_4$, $CdCr_2Se_4$, $Cu_{0.45}Fe_{0.55}Cr_2S_4$, $HgCr_4Se_4$, $CoCr_2S_4$, $HgCr_2S_4$, $ZnCr_2S_4$, $Cu_{0.45}Fe_{0.55}Cr_2Se_4$, and $$Cu_{0.5}In_{0.5}Cr_2Se_4$$ 

7. The process of claim 5 wherein Y is an anionic function selected from the group consisting of oxide, hydroxide, chloride, sulfate, and nitrate.

8. The process according to claim 5 wherein said reaction temperature is within the range of from about 200° C. to about 950° C.

9. The process of claim 5 wherein the Y anionic function of the substance AY and BY represents the same anionic function in both AY and BY.

10. The process of claim 8 wherein Y is chloride.

11. The process of claim 5 wherein said process comprises from 2 to about 6 of said cycles and wherein the temperature of step (a) of at least the first cycle of the process is within the range of from about 200° C. to about 500° C.

12. The process of claim 5 wherein A is selected from the group consisting of cadmium cations, cobalt cations, and mixtures thereof; and X represents sulfur.

13. A process for preparing a powder comprising finely-divided particles of a substance having the formula:

$$ACr_2X_4$$ 

wherein A is a divalent metallic cation or a mixture of univalent and trivalent metallic cations having a net divalent charge selected from the group consisting of cobalt cations, cadmium cations, and mixtures thereof; and wherein X is a material selected from the group consisting of sulfur, selenium, and mixtures thereof; said process comprising contacting an inorganic mixture with a chalcogen source at a temperature greater than about 200° C. and less than the decomposition temperature of the desired $ACr_2X_4$ powder in an environment inert to said mixture and source at said contacting temperature to react said mixture with the chalcogen component of said source, the chalcogen source comprising a reactive chalcogen component selected from the group consisting of sulfur, selenium, and mixtures thereof; the inorganic mixture comprising a mixture of a finely-divided substance having the formula AY and a finely-divided substance having the formula CrY, wherein A is as defined hereinabove and Y is an anionic function capable of volatilization at said contacting temperature without leaving a contaminating residue.

14. A process for preparing a powder comprising finely-divided particles of a substance having the formula:

$$AB_2X_4$$ 

wherein A is a divalent metallic cation, or a suitable mixture of univalent and trivalent metallic cations having a net divalent charge, of a substance selected from Periods 2–6 of Groups I–A—IV–A and I–B—VIII–B of the Periodic Table;

wherein B is a trivalent cation of a substance selected from the group consisting of vanadium, titanium, molybdenum, tin, gallium, indium, germanium, chromium, iron, manganese, and aluminum; and wherein X is an anion of a substance selected from the group consisting of sulfur, selenium, tellurium, and mixtures thereof;

said process comprising (a) contacting an inorganic mixture with a chalcogen source at a temperature greater than about 200° C. and less than the decomposition temperature of the desired $AB_2X_4$ powder to react the inorganic mixture with the source and (b) maintaining the inorganic mixture in finely-divided form throughout the reaction, said chalcogen source comprising a reactive chalcogen component selected from the group consisting of sulfur, selenium, tellurium, and mixtures thereof, said inorganic mixture comprising a physical mixture of a finely-divided substance having the formula AY and a finely-divided substance having the formula BY, wherein A and B are as defined above and Y is an anionic function capable of volatilization at said contacting temperature without leaving a contaminating residue.

15. The process of claim 14 wherein A is a cation of a substance selected from the group consisting of aluminum, copper, indium, zinc, iron, mercury, cobalt, cadmium and mixtures thereof.

16. The process of claim 14 wherein B is a cation of chromium, iron, manganese, and aluminum.

17. The process of claim 14 wherein B is a cation of chromium.

18. The process of claim 14 wherein X is an anion of sulfur or selenium.

19. A process for preparing a powder comprising finely-divided particles of a substance having the formula:

$$AB_2X_4$$

wherein A is a divalent metallic cation, or a suitable mixture of univalent and trivalent metallic cations having a net divalent charge, of a substance selected from Periods 2–6 of Groups I–A—IV–A and I–B—VIII–B of the Periodic Table;

wherein B is a trivalent cation of a substance selected from the group consisting of vanadium, titanium, molybdenum, tin, gallium, indium, germanium, chromium, iron, manganese, and aluminum; and wherein X is an anion of a substance selected from the group consisting of sulfur, selenium, tellurium, and mixtures thereof;

said process comprising (a) contacting an inorganic-mixture with a first chalcogen source comprising a reactive oxygen-containing material at a temperature greater than about 200° C. to react the inorganic mixture with the source to obtain an intermediate having the formula:

$$AB_2O_4$$

wherein A and B are as defined above and O is oxygen, (b) removing said reactive oxygen-containing chalcogen source material, and (c) contacting said intermediate at a temperature greater than 200° C. with a second chalcogen source comprising a reactive chalcogen component selected from the group consisting of sulfur, selenium, tellurium, and mixtures thereof to react said intermediate with said second chalcogen source thereby obtaining a final powder product having the formula $AB_2X_4$, said inorganic mixture comprising a physical mixture of a finely-divided substance having the formula AY and a finely-divided substance having the formula BY, wherein A and B are as defined above and Y is an anionic function capable of volatilization at said contacting temperature without leaving a contaminating residue.

20. The process of claim 19 wherein said process comprises from about 2 to about 6 cycles.

21. A process for preparing a powder comprising finely-divided particles of a substance having the formula:

$$ACr_2X_4$$

wherein A is a divalent metallic cation or a suitable mixture of univalent and trivalent metallic cations having a net divalent charge selected from the group consisting of aluminum cations, copper cations, indium cations, zinc cations, iron cations, mercury cations, cobalt cations, cadmium cations, and mixtures thereof; and wherein X is a material selected from the group consisting of sulfur, selenium, and mixtures thereof; said process comprising (a) preparing an inorganic mixture comprising a finely-divided substance having the formula AOH wherein A is as defined above and a finely-divided substance having the formula $Cr(OH)_3$, said inorganic mixture formed by addition to an aqueous solution of an amount of a basic reducing agent effective to co-precipitate the inorganic mixture from the solution, said aqueous solution having dissolved therein hexavalent chromium oxide and a material soluble in an aqueous hexavalent chromium oxide solution having the formula AZ wherein A is as defined above and Z is an anionic function; (b) contacting said inorganic mixture with a chalcogen source at a temperature greater than about 200° C. and less than the decomposition temperature of the desired $ACr_2X_4$ powder in an environment inert to the inorganic mixture and source at said contacting temperature to react said mixture with the chalcogen component of the source, said chalcogen source comprising a reactive chalcogen component selected from the group consisting of sulfur, selenium, and mixtures thereof; (c) cooling the inorganic mixture in an atmosphere inert to the mixture and reactive chalcogen component of said source; (d) maintaining said inorganic mixture in finely-divided form; and (e) repeating the cycle defined by (b)–(d) up to about 6 times, the temperature of step (b) of the first cycle being within the range of from about 200° C. to about 500° C.

References Cited

UNITED STATES PATENTS

| 3,476,690 | 11/1969 | Carnall, Jr. | 252—300 |
|---|---|---|---|
| 3,480,409 | 11/1969 | Dillon, Jr. et al. | 332—7.51 |
| 3,448,053 | 6/1969 | Haacke et al. | 252—62.51 |

FOREIGN PATENTS

| 1,146,481 | 3/1969 | Great Britain | 428—508 |

NORMAN G. TORCHIN, Primary Examiner

J. P. BRAMMER, Assistant Examiner

U.S. Cl. X.R.

252—300; 423—511

PO-1050
(5/69)

UNITED STATES PATENT OFFICE
CERTIFICATE OF CORRECTION

Patent No. 3,773,909      Dated November 20, 1973

Inventor(s) Donald Pearlman, Edward Carnall, Jr. and Thomas W. Martin

It is certified that error appears in the above-identified patent and that said Letters Patent are hereby corrected as shown below:

Column 12, line 73, "metalic" should read --metallic--.

Column 14, line 14, "$HgCr_4Se_4$" should read --$HgCr_2Se_4$--.

Signed and sealed this 18th day of June 1974.

(SEAL)
Attest:

EDWARD M. FLETCHER, JR.
Attesting Officer

C. MARSHALL DANN
Commissioner of Patents